(12) United States Patent
Divisi

(10) Patent No.: US 8,844,681 B2
(45) Date of Patent: Sep. 30, 2014

(54) DEVICE FOR OIL OR FLUID GREASE LUBRICATION

(75) Inventor: Walter Divisi, Monaco (MC)

(73) Assignee: Dropsa S.p.A., Milan (IT)

( * ) Notice: Subject to any disclaimer, the term of this patent is extended or adjusted under 35 U.S.C. 154(b) by 476 days.

(21) Appl. No.: 12/952,481

(22) Filed: Nov. 23, 2010

(65) Prior Publication Data

US 2011/0120804 A1   May 26, 2011

(30) Foreign Application Priority Data

Nov. 26, 2009   (IT) .............................. MI2009A2082

(51) Int. Cl.
| | |
|---|---|
| *F01M 1/00* | (2006.01) |
| *F16N 7/36* | (2006.01) |
| *F16N 7/38* | (2006.01) |
| *F16N 13/00* | (2006.01) |
| *F16N 21/00* | (2006.01) |
| *G01F 23/292* | (2006.01) |
| *F16N 29/00* | (2006.01) |

(52) U.S. Cl.
CPC ............ *F16N 29/00* (2013.01); *G01F 23/2925* (2013.01); *G01F 23/2921* (2013.01); *G01F 23/2927* (2013.01)
USPC .............................................. 184/26; 184/36

(58) Field of Classification Search
CPC ......... F16N 13/10; F16N 13/20; F16N 19/00; F16N 29/00
USPC .................................. 184/6.26, 6.28, 26, 27.1
See application file for complete search history.

(56) References Cited

U.S. PATENT DOCUMENTS

| | | | | |
|---|---|---|---|---|
| 3,548,657 | A | * | 12/1970 | Panerai et al. ................... 73/293 |
| 3,604,535 | A | * | 9/1971 | Whitaker ........................... 184/6 |
| 4,051,726 | A | * | 10/1977 | Hastbacka ................... 73/290 R |
| 4,425,794 | A | * | 1/1984 | Duesbury ......................... 73/293 |
| 4,772,799 | A | * | 9/1988 | Inui et al. ........................ 250/551 |
| 4,859,987 | A | | 8/1989 | Markus |
| 5,042,618 | A | * | 8/1991 | Switalski et al. ............ 184/6.26 |
| 5,205,378 | A | | 4/1993 | Boelkins |
| 5,743,135 | A | * | 4/1998 | Sayka et al. .................... 73/293 |
| 6,065,689 | A | | 5/2000 | Kizer et al. |
| 6,131,471 | A | | 10/2000 | Okoren et al. |

(Continued)

FOREIGN PATENT DOCUMENTS

| | | |
|---|---|---|
| DE | 3841265 A1 | 12/1988 |
| EP | 0 314 969 A2 | 5/1989 |

(Continued)

OTHER PUBLICATIONS

U.S. Appl. No. 12/952,393—"Minimal Lubrication Device" filed Nov. 23, 2010.
U.S. Appl. No. 12/952,444—"Minimal Lubrication Device" filed Nov. 23, 2010.

*Primary Examiner* — Henry Liu
(74) *Attorney, Agent, or Firm* — Novak Druce Connolly Bove + Quigg LLP

(57) ABSTRACT

A device for oil or fluid grease lubrication, including a reservoir able to house a determined quantity of lubricant, a pump arranged to draw the lubricant from the reservoir and to feed it under pressure to a delivery port to which a lubricant distribution pipe can be connected, a control unit arranged to regulate the pump operation, and a sensor for sensing the lubricant level within the reservoir. The level sensor is an infrared sensor.

11 Claims, 2 Drawing Sheets

(56) References Cited

U.S. PATENT DOCUMENTS

| | | |
|---|---|---|
| 6,161,395 A | 12/2000 | Okoren et al. |
| 6,276,901 B1 * | 8/2001 | Farr et al. .................. 417/13 |
| 6,925,871 B2 * | 8/2005 | Frank ........................ 73/293 |
| 2002/0144865 A1 | 10/2002 | Clancy et al. |
| 2007/0225637 A1 * | 9/2007 | Ono et al. .................. 604/65 |
| 2008/0193828 A1 * | 8/2008 | Sahu ........................ 429/63 |

FOREIGN PATENT DOCUMENTS

| | | |
|---|---|---|
| EP | 0 493 982 A1 | 7/1992 |
| EP | 1 275 895 A1 | 1/2003 |
| GB | 870632 | 6/1961 |

* cited by examiner

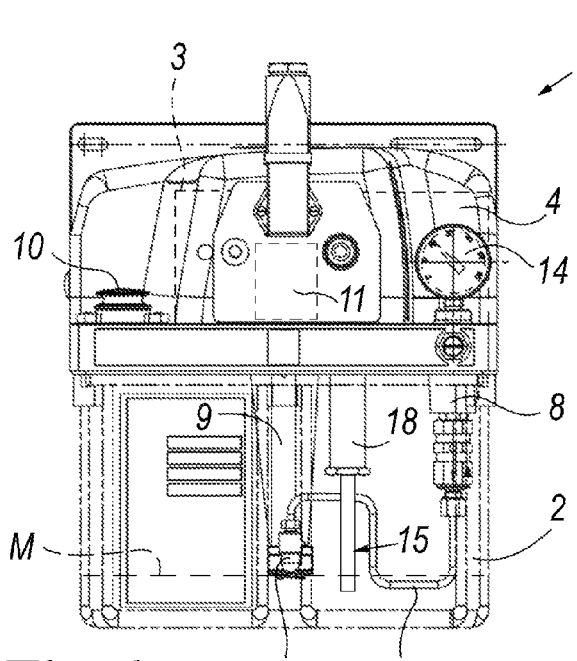
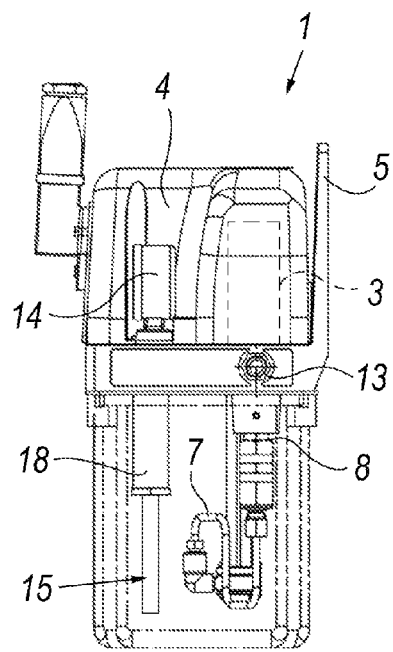
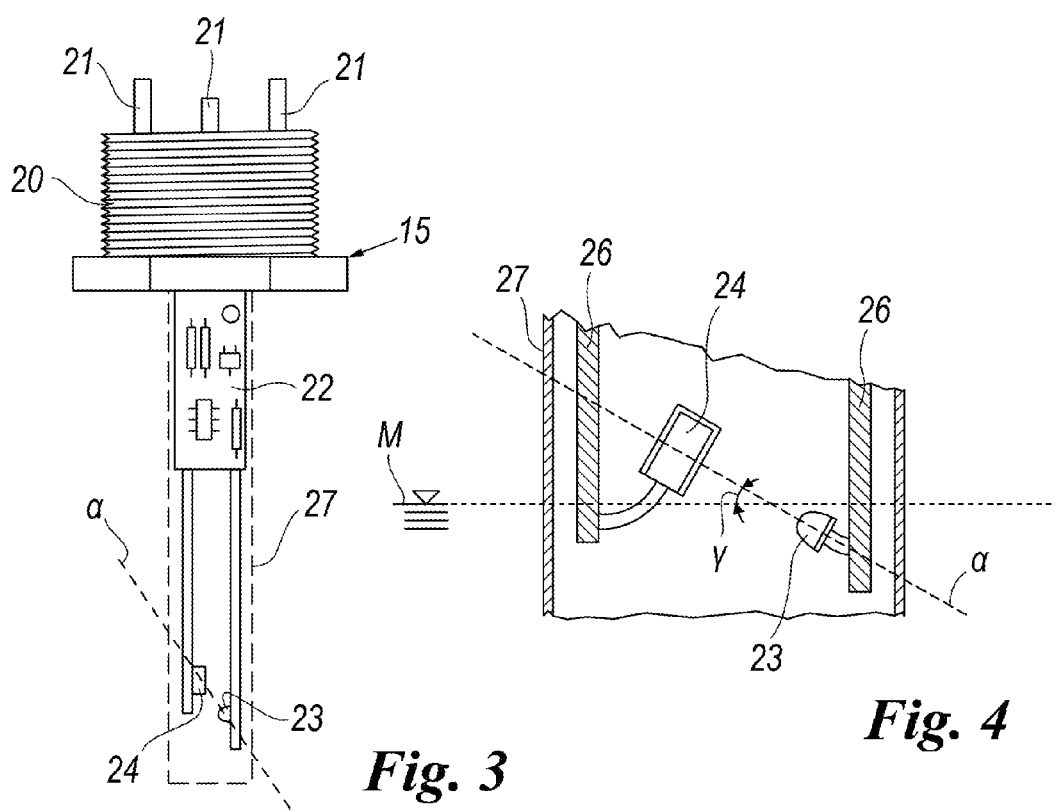
Fig. 1
Fig. 2
Fig. 3
Fig. 4

DEVICE FOR OIL OR FLUID GREASE LUBRICATION

CROSS REFERENCE TO RELATED APPLICATIONS

This application claims the priority of Italian Patent Application No. MI2009A002082 filed on Nov. 26, 2009.

The present invention relates to a device for oil or fluid grease lubrication. More particularly, it relates to a lubrication device which can be fed either by oil or by fluid grease.

Devices for oil or fluid grease lubrication are commercially available. They normally comprise a reservoir containing oil or fluid grease at choice. A pump is also provided, controlled by a suitable control unit, which pressurizes the lubricant contained in the reservoir, to feed it to a lubrication system connected to the device.

A device such as that described is marketed by Dropsa SPA for example with the brand name PRISMART. This device can operate either with fluid grease or with oil. Depending on the lubricant type used, the pump is equipped either with a float-type lubricant level sensor incorporating an electric contact (for oil) or with a capacitive sensor (for fluid grease). In this respect, a float type sensor is unable to read the presence of fluid grease, while a capacitive sensor has a significant cost disadvantage if used to detect the presence of oil.

A screw coupling to which one or the other sensor can be fixed is provided on the pump, inside the reservoir.

This creates problems given that both sensor types have to be available in store and both types have to be ordered for supply. Moreover capacitive sensors are very costly.

U.S. Pat. No. 6,161,395-A and DE 3,841,265-A1 describes liquid level sensors known in the prior art.

An object of the present invention is therefore to provide a lubrication device comprising a sensor which is economical and able to sense both the presence of oil and the presence of fluid grease, in equally reliable manner.

This and other objects are attained by a lubrication device formed in accordance with the technical teachings of the accompanying claims.

Further characteristics and advantages of the invention will be apparent from the description of a preferred but non-exclusive embodiment of the device, illustrated by way of non-limiting example in the accompanying drawings, in which:

FIG. 1 is a front view of the device of the present invention;

FIG. 2 is a side view of the device of FIG. 1;

FIG. 3 is a schematic view of an infrared sensor fitted to the device of FIG. 1;

FIG. 4 is an enlarged schematic sectional view of a detail of the sensor of FIG. 3;

Figure 5:
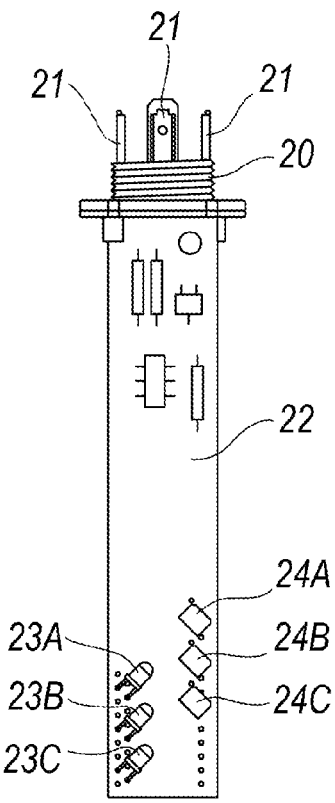
FIG. 5 is a schematic view of a different embodiment of the sensor fitted to the device of FIG. 1.

With reference to said figures, these show a device for oil or fluid grease lubrication indicated overall by the reference numeral 1.

It comprises a reservoir 2, preferably made of transparent plastic material, able to house a determined quantity of lubricant, whether fluid grease or oil.

A pump 3 is also provided housed in a casing 4 provided with a support 5 for wall fixing. The pump 3 draws the lubricant from the reservoir positioned below it via a nozzle 6 connected by a suitable pipe 7 to the suction port 8 of the pump. The nozzle is fixed at a suitable height to a support 9 which extends into the reservoir 2. A delivery port of the pump 3 is connected to a pressurized lubricant outlet 13 to which suitable pipes of a distribution system are connected to enable the lubricant to be carried to the required positions.

The reservoir interior is accessible via an aperture closed by a removable plug 10.

In the described example the pump is of electrically driven gear type, but can be of pneumatic or any other type. It is controlled by a control unit which regulates its operation. In particular, the control unit is associated with a pressure switch which regulates the lubricant exit pressure. A pressure gauge 14 is also present indicating the pressure at which the lubricant is delivered. The control unit 11 is also associated with a sensor 15 housed in the reservoir to measure the level of the oil and fluid grease present therein.

In particular the sensor is of infrared optical type. In this respect it has been surprisingly noted that a sensor of this type is able to sense the presence both of oil and of fluid grease inside the reservoir, and provide reliable and accurate readings whether the one or the other lubricant type is present in the reservoir.

The sensor is advantageously screwed to a support 18 already present in the reservoir. The sensor comprises a coupling 20, preferably threaded, which enables it to be coupled to the support 13. Electric contacts 21 project from the coupling for electrical connection to the control unit 11.

The sensor 15 presents a printed circuit 22 in which chips, resistors and diodes are provided able to control the operation of an infrared emitter 23 facing a photodiode 24, preferably of PIN type.

The photodiode 24 comprises a screen 25 with infrared filter. The axis passing for the centre of the emitter 23 and for the centre of the photodiode 24, (that substantially represents the direction of the infrared beam emitted by the emitter hitting the sensitive zone of the photodiode), is inclined with respect to the surface level M of the lubricant present in the reservoir.

The height of the surface level varies during the use of the device, and lowers down with the consumption of the lubricant. Its alignment otherwise remains always the same and substantially parallel to the horizon, cause is determined by the gravity force acting on the liquid.

Substantially the emitter and the photodiode are misaligned with respect to the level of the lubricant during the normal operation of the device, so that, when the lubricant reaches a predetermined level M, the emitter is sink in the lubricant while the photodiode is outside the lubricant.

It was noted that with this configuration an optimal reading of the predetermined level can be achieved even with lubricants of very different characteristics (density, dispersion index etc), like grease or oil.

Especially when the level of the liquid lies between the photodiode and the emitter (see FIG. 4), the infrared radiation emitted by the emitter is strongly dispersed (regardless of the type of the lubricant, whether oil or fluid grease) and reaches the photodiode only to a minimum extent. This is due to the fact that both air and lubricant are present between the emitter and the photodiode causing internal refraction due to the air/lubricant boundary layer.

When the lubricant is below the level of the sensors the radiation emitted by the emitter reaches the photodiode with greater intensity. This also occurs if the photodiode and emitter are merely "soiled" with fluid grease or oil consequent on having been immersed in the lubricant.

In concluding the description it should be noted that the photodiode and emitter are installed on plates 26 fixed to the sensor, the entire assembly being surrounded by a lowerly open tubular element.

Advantageously the diode emits infrared radiation at a peak wavelength of 950 nm with a spectral bandwidth of 50 nm, however this can lie between 250 nm and 1300 nm, choosing a pair of frequency tuned devices.

The emitter and sensor are spaced apart by a distance "d" of between 40 mm and 1 mm, preferably 8 mm.

The operation of the invention is apparent to an expert of the art from the aforegoing description, and is as follows.

The reservoir is filled with the desired lubricant (either oil or fluid grease) to the maximum level.

The photodiode converts the radiation received from the emitter (preferably always active) into a potential difference which is measured across its ends. The control unit 22 reads the potential difference across the photodiode and when both the photodiode and the emitter are immersed in the lubricant an intermediate voltage can be read (for example below 2.4V).

As the fluid level gradually falls as a result of being consumed by the lubrication system, the photodiode emerges from the lubricant while the emitter is still immersed in the lubricant (level M, FIG. 4). The reading of the photodiode thus reaches a minimum, because the infrared beam is internally refracted by the passage boundary layer created lubricant and air. In those condition only a small part (or none) of the beam reaches the photodiode and the reading of the photodiode is very low (for example 0.1 V).

With a further decrease of the lubricant level the reading (voltage) quickly increases to maximum intensity, for example 4.5V.

When the control unit connected via connectors 21 (in known manner) detects a strong decrease of the reading for example below 2.5V, a "minimum lubricant level" signal is given.

In that case the control unit acts to either stop the pump or to activate an alarm signal which can be transmitted to the final user in any manner.

A preferred embodiment has been described, however others can be conceived utilizing the same inventive concept.

In a different embodiment the position of the infrared emitter and of the photodiode can be inverted.

In a further embodiment, the minimum lubricant level can be positioned much above the level at which the pump dipping nozzle 6 is positioned. This enables a prior warning to be generated before the lubricant level falls below the position of the dipping nozzle.

Figure 6:
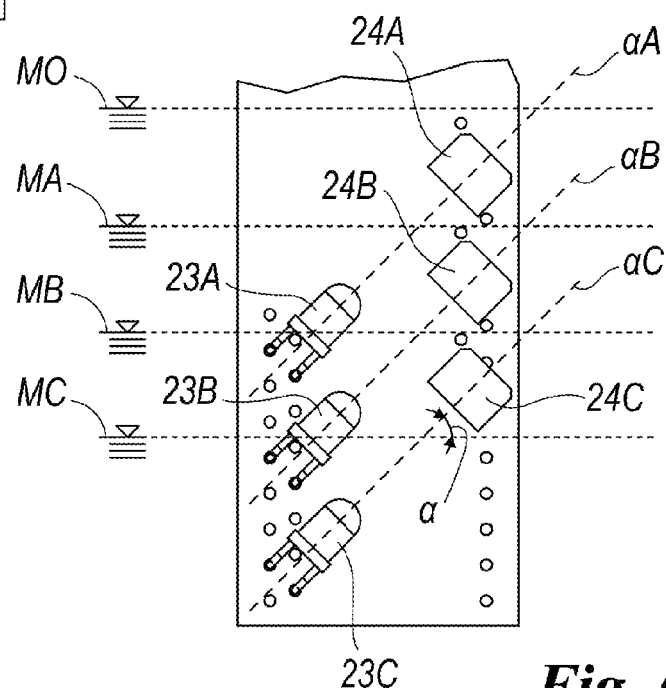
FIG. 6 is an enlarged schematic sectional view of a detail of the sensor of FIG. 5.

Several photodiode/emitter pairs can also be provided to transmit different level readings to the control unit, as shown in FIGS. 5 and 6. There an initial "alarm" threshold is provided (MA, sensors 23A, 24A), a "medium level" threshold (MB, sensors 23B, 24B) and a "minimum level" threshold (MC, sensors 23C, 24C). When the lubricant level is for example at M0, no alarms are active.

In an alternative embodiment of the invention, a pump drawing pressurized lubricant from the reservoir is not present, but instead the reservoir is pressurized directly by a suitable pneumatic system, for example of compressed air type.

In all the described embodiments the angle γ between the axis α, αA, αB, αC and the surface M, (that is the same of M0, MA, MB, MC cause it is determined by the gravity force acting on the lubricant), can be comprised between substantially 90° and 5°, but preferably is 45°. This angle γ in fact maximize the refraction of the infrared beam.

The angle γ can be chosen as a result of a best-compromise between the function of the internal refraction and a configuration that allows adherent and fluid grease lubricants to drip off the photodiode and emitter. For this reason they are placed ideally at 45 degrees.

The invention claimed is:

1. A device for oil or fluid grease lubrication, comprising:
   a reservoir for housing a determined quantity of lubricant,
   means for pressurizing said lubricant to feed said lubricant to a delivery port to which a lubricant distribution pipe can be connected,
   a control unit arranged to regulate a pump operation, and
   a sensor for sensing a lubricant level within the reservoir, said sensor being an infrared sensor comprising an infrared emitter facing a photodiode,
   wherein a single axis passes through both the photodiode and the infrared emitter,
   wherein the single axis substantially corresponds with the direction of an infrared beam emitted by the emitter and received by the photodiode, and
   wherein the photodiode and the infrared emitter are misaligned with respect to the surface level of the lubricant contained in the reservoir during normal operation of the device, so when the surface of the lubricant in the reservoir reaches predetermined level, one between the photodiode and the infrared emitter is submerged in the lubricant and the other is outside of the lubricant.

2. A device according to claim 1, wherein the infrared emitter, at the predetermined level, is submerged in the lubricant and the photodiode is outside of the lubricant.

3. A device according to claim 1, wherein an axis connecting the photodiode and the infrared emitter is inclined of an angle between 90° and 2° with respect to the surface level of the lubricant.

4. A device according to claim 1, wherein different pairs of infrared emitter-photodiode are provided, each of the pairs being correlated with a different predetermined level.

5. A device as claimed in claim 1, wherein said means for pressurizing said lubricant comprise a pump arranged to draw said lubricant from the reservoir and to feed said lubricant to the delivery port, or a reservoir pressurization system.

6. A device as claimed in claim 5, wherein said photodiode comprises a screen with an infrared filter.

7. A device as claimed in claim 6, wherein said infrared emitter emits infrared radiation at a peak wavelength of 950 nm with a spectral bandwidth of 50 nm.

8. A device as claimed in claim 1, wherein said infrared emitter and said infrared sensor are spaced apart by a distance between 40 mm and 1 mm.

9. A device as claimed in claim 1, wherein said infrared sensor and said infrared emitter are positioned at the height of the minimum lubricant level in the reservoir, substantially aligned with the suction nozzle of said pump or with a dip tube connected to said delivery port.

10. A device according to claim 3, wherein the angle is 45° with respect to the surface level of the lubricant.

11. A device as claimed in claim 8, wherein said infrared emitter and said infrared sensor are spaced apart by a distance of 8 mm.

\* \* \* \* \*